United States Patent [19]

Cook

[11] 4,145,293
[45] Mar. 20, 1979

[54] PRECISE CUTOFF CONCENTRATOR-DIALYZER DEVICE

[75] Inventor: Melvin W. Cook, Beaverton, Oreg.

[73] Assignee: Bio-Molecular Dynamics, Beaverton, Oreg.

[21] Appl. No.: 842,095

[22] Filed: Oct. 14, 1977

[51] Int. Cl.² .................................................. C02B 1/82
[52] U.S. Cl. ................................. 210/321 A; 210/456
[58] Field of Search ................... 55/16, 158; 210/22, 210/23 R, 23 F, 321 R, 321 A, 247, 456

[56] References Cited

U.S. PATENT DOCUMENTS

| 3,783,127 | 1/1974 | Cook et al. | 210/22 |
| 4,033,723 | 7/1977 | Givner et al. | 210/22 R X |

*Primary Examiner*—Ferris H. Lander

*Attorney, Agent, or Firm*—Chernoff & Vilhauer

[57] ABSTRACT

A self-contained apparatus for concentrating and dialyzing protein and other macromolecular liquid samples rapidly to precise, predetermined microliter quantities. An elongate rod of predetermined volume, having irregular cross section along its length, is disposed within a semi-permeable membrane sample container in spaced juxtaposition with the membrane to maximize the rates of concentration and dialysis. The rod also cooperates with a sample collection chamber sealingly interconnected detachably with the bottom of the membrane to automatically provide a predetermined final sample volume precise to within two microliters. The rod includes a member, detachably coupled with and extending into the cllection chamber for providing the collection chamber with a predetermined volume.

8 Claims, 2 Drawing Figures

PRECISE CUTOFF CONCENTRATOR-DIALYZER DEVICE

BACKGROUND OF THE INVENTION

This invention relates to a device for use primarily in laboratories for concentrating and dialyzing a sample of macromolecules, such as a protein solution, in order to prepare the sample for isolation, purification or characterization procedures. More specifically the invention relates to improvements in a combination concentrator-dialyzer device of the type shown in my U.S. Pat. No. 3,783,127, the disclosure of which is herein incorporated by reference in its entirety. It is believed that the prior art most pertinent to this invention comprises my aforementioned U.S. patent and the references cited therein.

SUMMARY OF THE INVENTION

The present invention is directed to improvements in a self-contained device for concentrating, dialyzing or simultaneously dialyzing and concentrating, through the same semipermeable membrane, protein and other macromolecular sample solutions rapidly to precise microliter quantities. In the improved device, the walls of a container for holding the sample solution include a semipermeable elongate membrane shaped as an elongate walled enclosure and mounted in a substantially vertical position, the membrane being surrounded by continuously stirred dialysate under vacuum. The container further includes a sample reservoir cup mounted atop the membrane, such that the membrane contacts the sample held therein, and a sample collection chamber having a top sealingly and detachably interconnected with the membrane adjacent the bottom of the membrane for holding a lower portion of the sample while the sample is being processed. The reservoir cup is exposed to atmospheric pressure creating a pressure differential between the sample held within the container and the continuously stirred dialysate under vacuum to cause extraction of material from the sample through the semipermeable membrane.

An elongate object, preferably a cylindrical rod of impermeable material, is inserted within the membrane enclosure so as to be housed within the walls thereof in spaced-apart, juxtaposed relationship with the membrane and extending along the length thereof. The function of the rod is multifold. First, the rate of concentration of the sample solution is proportional to the membrane surface area to which the sample is exposed; thus, when the rod is positioned within the membrane it displaces a portion of the liquid sample thereby maximizing the amount of surface area of the sample which is in contact with the membrane per unit volume of the sample in the container and increases the rate of concentration by several multiples. Second, the rate of dialysis is related to the concentration gradient at the membrane surface and also to the distance the dialyzable molecules must travel to reach that surface. With the rod positioned within the membrane, this distance is significantly reduced thereby increasing the rate of dialysis.

As concentration of the macromolecules within the container takes place, the liquid level within the membrane progressively decreases until its meniscus reaches the top of the sample collection chamber. Once the meniscus reaches the top of the collection chamber, the liquid is no longer in contact with the membrane. At this point, the dialysis and concentration processes stop automatically. By means to be described hereafter, a precise cutoff of ±2 microliters is automatically obtained before the sample is concentrated to a volume less than the volume of the collection chamber.

Besides enabling the automatic predetermination of final sample volumes as just described, vertical positioning of the membrane eliminates horizontal surfaces (the major cause of concentration polarization on membranes that deviate from the vertical) and assures that only a minimum loss of sample can occur during dialysis and concentration.

To the extent that the rod is not spaced equidistantly from all sides of the membrane enclosure which surrounds it, disproportionate capillary action or "wicking" may occur causing the opposing sides of the meniscus of the samle within the membrane to assume a plane other than horizontal. This problem must be overcome because the opposing sides of the meniscus must be in a substantially horizontal plane when the meniscus reaches the top of the collection chamber in order to obtain a precise microliter cutoff. To alleviate this potential drawback of the rod, a meniscus reorientation means is provided adjacent a lower portion of the rod and above the top of the collection chamber for reshaping the meniscus, as the meniscus advances toward the top of the collection chamber, from a configuration caused by the presence of the rod wherein the opposing sides of the meniscus are in a plane other than horizontal to a configuration wherein the opposing sides are in a substantially horizontal plane. By providing the rod with an irregular cross-section along its length, the space between the rod and the membrane is varied at predetermined locations along the length of the rod so as to minimize capillary action before the meniscus reaches the collection chamber thereby permitting the opposing sides of the meniscus to reorient to a substantially horizontal plane.

A horizontally adjustable positioning means is provided for movably mounting the rod in any of a plurality of substantially vertical positions within the membrane, both for minimizing the above-described wicking and also for preventing the rod from contacting the membrane so as to eliminate any loss of sample caused by the rod touching the membrane.

The device further includes an impermeable object comprising a displacement member of predetermined volume coupled with the rod adjacent the bottom thereof extending into the collection chamber and detachably coupled therewith for displacing a portion of the sample in a plane coincident with the top of the collection chamber for decreasing the effective width of the meniscus in this plane, thereby enhancing precision, and providing the collection chamber with a predetermined volume. This feature, when coupled with the detachability of the rod and collection chamber relative to one another and relative to the membrane and housing of the device, and the provision of multiple, different sized collection chambers and displacement members, permits concentration to any of a wide range of precise volumetric quantities, either by replacing the rod and displacement member or the collection chamber with a like object of higher or lower volume.

Yet further features and advantages of the present invention will become apparent, and the full nature of the invention will be more readily understood from the accompanying drawings and the following descriptions and claims.

DETAILED DESCRIPTION OF THE INVENTION

Figure 1:
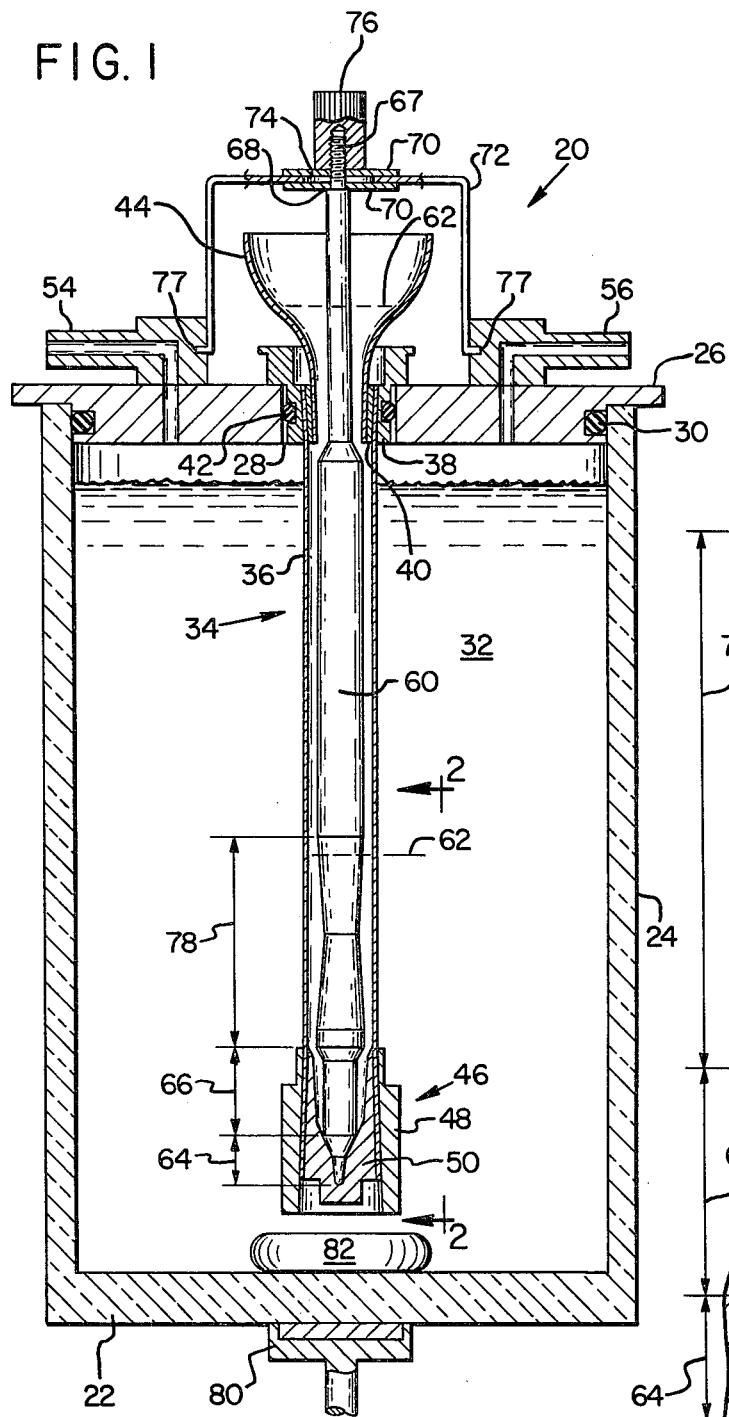
FIG. 1 is a cross section view of an illustrative embodiment of the concentrator-dialyzer device.

The illustrative concentrator-dialyzer device, designated generally as 20 in FIG. 1, comprises a vertical cylindrical housing 22 having upright walls 24 and a top plate 26 having an aperture 28 formed herein. The housing 22 is constructed of any suitable material, such as transparent acrylic plastic, but preferably is constructed of heat-resistant and chemical-resistant glass so as to permit autoclaving thereof. Top plate 26 is sealingly and detachably mounted on the upright walls 24 of the housing 22 by virtue of a tight-fitting elastomer O-ring 30. The O-ring 30 facilitates the removal and resealing of top plate 26 to permit access to the interior of housing 22 for servicing of the device, such as for cleaning same or adding and removing a liquid dialysate 32.

A container, designated generally as 34, is disposed vertically within the housing 22, the wall of which includes an elongate semipermeable membrane 36 of material compatible with the sample and preferably shaped as a hollow tube. For example, in the processing of water-mixed protein samples, cellulose dialyzer tubing N0. 4465A2 sold by Arthur H. Thomas Company of Philadelphia, Pennsylvania is a suitable material since it is permeable to water molecules and other low molecular weight compounds such as salts, and thus permits their extraction through the membrane material. Conversely, the material is impermeable to substances of high molecular weight such as proteins (i.e., weights of about 12,000 and higher) and thus prevents their passage therethrough. Other permeability and material characteristics may be desirable depending on the sample to be processed.

The interior of the membrane 36 is sealed from the interior of the housing 22 and is secured to the top end plate 26 by being sandwiched between a sleeve 38 and matching top collar 40. A second O-ring 42 disposed between the sleeve 38 and the aperture 28 formed in the top end plate 26 provides a vacuum seal and detachably couples the container 34 with the top end plate 26 for permitting the container 34 to be removed from the housing 22 independently of the top end plate. The inside aperture of the top collar 40 is tapered so as to closely receive a matching tapered, sample reservoir chamber 44 for receiving an upper portion of the sample. The interior of the sample reservoir chamber 44 is exposed to atmospheric pressures and communicates with the interior of the membrane 36 for permitting the membrane to contact the liquid sample.

Figure 2:
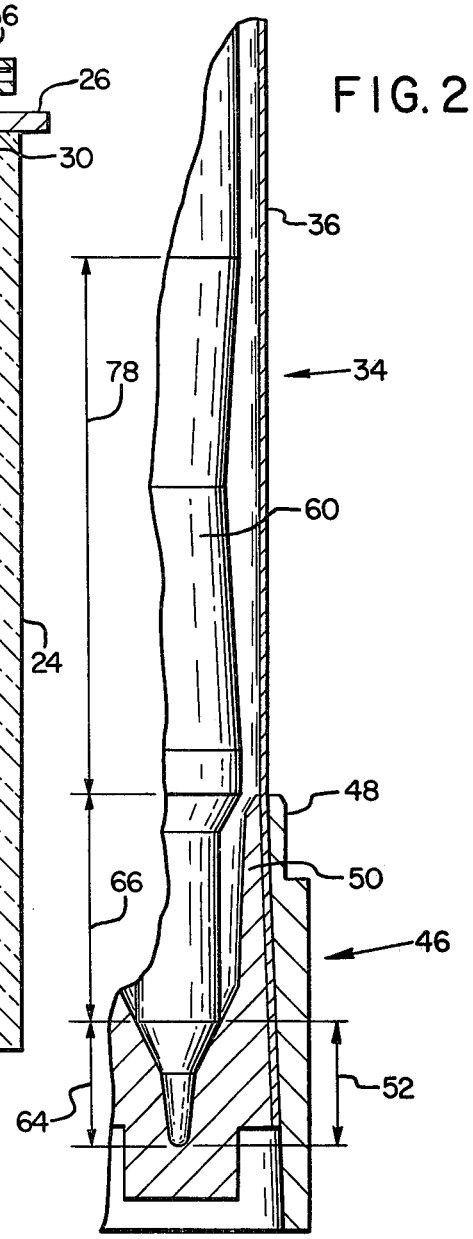
FIG. 2 is an enlarged detail view taken along line 2—2 of FIG. 1.

The container 34 further includes a sample collection chamber, designated generally as 46, having a top sealingly interconnected with the membrane 36 adjacent the bottom of the membrane and coupled with the interior of both the membrane and sample reservoir chamber 44. As best seen in FIG. 2, the membrane is sealingly and detachably connected with the sample collection chamber 46 by being wedged between a collar 48 and the exterior wall 50 permitting the collection chamber to be readily removed and replaced with a second collection chamber of dissimilar volume. It is particularly important to note that the lower interior portion 52 of the reservoir chamber is provided with a predetermined configuration and volume which remains constant irrespectively of the remaining volume of the reservoir chamber for purposes hereinafter described. The aperture 28 in the top plate 26 is large enough to permit the removal of the sample collection chamber 46 therethrough together with the container 34.

In addition to aperture 28, the top end wall 26 of housing 22 contains two ducts 54 and 56 respectively, each communicating between the exterior and interior of housing 22. These ducts each comprise an evacuation passageway by which the interior of the housing 22 is subjected to subatmospheric pressure by coupling the duct with a primary source of vacuum.

An elongate object 60, preferably a cylindrical rod of impermeable material having irregular cross section along its length, is detachably and vertically mounted within the container 34 in spaced-apart, juxtaposed relationship with the membrane 36 for displacing a portion of the initial liquid sample, denoted generally by dashed lines 62, thereby raising its level and maximizing the amount of surface area of the sample which is in contact with the membrane 36 per unit volume of the sample in the container 34. The bottom portions 64 and 66 of the rod 60 are disposed vertically within the container 34 such as to extend into the collection chamber 46 and be detachably coupled therewith both for decreasing the effective width of the meniscus at the top of the collection chamber, thereby enhancing the precision of the process cutoff, and for establishing a predetermined volume within the collection chamber. Portion 64 of the rod 60 is provided with a configuration and volume which matches that of the lower portion 52 of the collection chamber 46; whereas, the configuration and volume of portion 66 varies from one rod to another so as to selectively variably determine the volume of the collection chamber. In this regard, it is important to note that lower portions 64 and 66 could alternatively be separate from the rod 60 or, constitute a telescoping portion of one or both of the rod 60 and the collection chamber so as to provide adjustability of the volume of the collection chamber 46.

The top portion of the rod 60 includes a threaded portion 67 and a shoulder 68 upon which a pair of washers 70 and a rod positioning band 72 are mounted, the bracket being provided with an aperture 74 which is significantly larger than the threaded portion 67 of the rod for permitting the rod to be positioned in any of a plurality of vertical positions. Once the rod has been vertically positioned, so as to be spaced away from the membrane 36 along the full length of the rod, the rod is secured in place by tightening a knurled knob 76 on the threaded portion 67 of the rod. It should also be noted that the ends 77 of the rod positioning band are detachably coupled with the ducts 54 and 56 by being pressed into corresponding notches formed therein; accordingly, the rod positioning band performs multiple functions: it maintains the rod in a vertical position out of engagement with the membrane 36 thereby preventing protein loss between the rod and membrane; it reduces the likelihood of "wicking" and thus minimizes meniscus distortion caused by the rod being nonconcentrically mounted relative to the membrane 36; and, by establishing a reference point, prevents excessive downward pressure on the membrane caused by the installation of the rod, thereby assuring the reproducibility of the functional length of the membrane.

It is particularly important to note that the rod 60 is provided with a meniscus reorientation section 78, preferably comprising opposed truncated conical sections, for reshaping the meniscus of the liquid sample, as the meniscus advances toward the top of the collection chamber 46. As best seen in FIG. 2, the truncated sections on the rod constitute means defining an irregular cross-section along the length of the rod whereby minimum spacing between the rod and the membrane 36 is generally maintained along the length of the rod to maximize the rates of concentration and dialysis; whereas maximum spacing between the rod and membrane occurs above the top of the collection chamber at the meeting place of the opposed truncated conical sections. This maximum spacing serves to minimize the effect of deviations in the spacing between the rod and membrane caused by nonconcentricity therebetween or irregular membrane shape, thereby significantly decreasing the effects of capillary action. Thus, the maximum spacing permits the sides of the meniscus to be shaped from a plane other than horizontal (which may be caused by capillary action between the upper portions of the rod and the membrane) to a configuration wherein the opposing sides of the meniscus are in a substantially horizontal plane as the meniscus advances toward the top of the collection chamber. The spacing between rod and membrane is gradually decreased from the point of maximum spacing toward the collection chamber 46 so as to maximize the rate of concentration over the last few microliters of the sample immediately adjacent the top of the collection chamber, and to minimize the width of the meniscus at the top of the collection chamber. It is important to note that deviations in spacing between the rod and membrane will be minimal immediately above the top of the collection chamber, due to the coupling between the rod and collection chamber; accordingly, the amount of wicking in this area will be insufficient to significantly re-distort the meniscus.

To prepare the concentrator-dialyzer device 20 for operation, the housing 22 is filled with a suitable liquid, with top plate 26 removed, in accordance with the methodology recited in my aforementioned U.S. patent. The liquid surrounding the semipermeable membrane tube is continuously stirred by a magnetic stirrer 80 of conventional design over which the housing is placed. A bar magnet 82 is disposed in the interior of the housing so as to rest upon the bottom thereof and continuously stirs the liquid 32 to enhance the rate at which the sample is processed.

The principles of the present invention are equally applicable to larger concentrator-dialysis devices including ones using multiple membranes and multiple rods, each rod being vertically disposed within a respective one of the membranes. The present device utilizes the methodology of my aforementioned U.S. patent and is useful in a wide range of laboratory applications including one where the molecules of the solution and dialysate are the same. In such an application, the system will be at equilibrium, because the rates of passage of permeative molecules from the solution into the dialysate and from the dialysate into the solution will be identical. If a vacuum is applied to the dialysate and the solution is maintained at atmospheric pressure, a pressure and activity gradient will be formed at the membrane surface, due to a reduction of molecular activity within the dialysate. This will result in a net increased flow of permeative molecules into the dialysate, thereby effecting a reduction in volume of the solution. If nonpermeable macromolecules are added to the solution, concentration of the macromolecules will result. However, the rate of concentration will be slightly less than the identical situation without macromolecules, due to a decrease in the activity proportional to the concentration of macromolecules added.

Further, when a solution of identical or other salts of lower molar concentration than in the dialysate is applied to the membrane, the net rate of passage of water molecules will be in the direction of the dialysate and the net rate of passage of salt molecules will be in the direction of the solution. If a vacuum is applied to the dialysate, the effect will be a reduction in volume of the solution. If nonpermeable macromolecules are added to the solution, concentration of the marcromolecules will be effected. However, the rate of concentration will be somewhat faster than in the previous situation because of the initial net flow of water into the dialysate.

Moreover, when a solution of identical or other salts of higher molar concentration than in the dialysate is applied to the membrane, the net rate of passage of water molecules will be from the dialysate into the solution. This will have the effect of increasing the volume of the solution. If a vaccum is applied to the dialysate, a reduction in volume of the solution will result. However, this reduction will be somewhat slow initially as compared to the foregoing two situations. If nonpermeable macromolecules are added to the solution, a further decrease in activity will occur within the solution. The rate of reduction in volume of the solution will again remain relatively slow until the activity of permeative molecules on both sides of the membrane approaches equilibrium. As such time, a further increased net passage of permeative molecules will be in the direction of the dialysate, resulting in a concentration of the macromolecules. A situation of this type requires approximately 5 percent to 10 percent additional time for dialysis and concentration of the macromolecules.

It is important to note that the present device is also operable without a dialysate being placed within the housing 22 for effecting macromolecular separation (filtration). In such an operation, a container (not shown) is placed within the housing 22 and positioned therein so as to collect materials being extracted through the membrane 36 thereby permitting measurement of the degree of binding among materials of the liquid sample.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A laboratory device for concentrating a liquid sample by extracting material therefrom through a semipermeable membrane, said device comprising:
   (a) an upright housing having walls, a top with an aperture formed therein and first coupling means for sealingly and detachably mounting said top on said walls;
   (b) container means adapted to be mounted within said housing for holding said liquid sample while said sample is being concentrated, the wall of said container means including a semipermeable elongate membrane mounted in a substantially vertical position so as to contact said sample held in said container means;

(c) second coupling means independent of said first coupling means for sealingly and detachably coupling said container means with said aperture and permitting removal of said container means from said housing through said aperture without the detachment of said top from said housing walls, said aperture being of sufficient size to permit said removal therethrough; and (d) a sample collection chamber adapted to be mounted within said housing having a top sealingly and detachably interconnected with said membrane adjacent the bottom of said membrane and coupled with the interior of said container means for holding a lower portion of said sample while said sample is being concentrated, said aperture being of a size sufficient to permit removal of said sample collection chamber through said aperture together with said container means.

2. The device of claim 1 including an elongate object disposed vertically within said container means in spaced-apart juxtaposed relation with said membrane and an impermeable displacement member of predetermined volume coupled with said elongate object adjacent the bottom thereof extending into said collection chamber and detachably coupled therewith for establishing a predetermined volume within said collection chamber.

3. The device of claim 2 including means for detachably mounting said elongate object within said container means.

4. A laboratory device for concentrating or dialyzing a liquid sample by extracting material therefrom or exchanging material therewith through a semipermeable membrane, or performing both simultaneously, said device comprising:

(a) container means for holding said liquid sample, the wall of said container means including a semipermeable elongate membrane mounted in a substantially vertical position so as to contact said sample held in said container means;

(b) means comprising an elongate object disposed vertically within said container in spaced-apart, juxtaposed relationship with said membrane for displacing a portion of said liquid sample and thereby maximizing the amount of surface area of said sample which is in contact with said membrane per unit volume of said sample in said container means and minimizing the distance between said membrane and said sample so as to maximize the rate at which material is extracted from or exchanged with said sample in said container means; and (c) a sample collection chamber having a top sealingly interconnected with said membrane adjacent the bottom of said membrane and coupled with the interior of said container means for holding a lower portion of said sample while said sample is being concentrated, whereby the meniscus of said sample reaches said top of said collection chamber before said sample is concentrated to a volume substantially less than the volume of said collecton chamber, further including meniscus reorientation means within said container means adjacent a lower portion of said elongate object and above the top of said collection chamber for reshaping the meniscus of said liquid sample, as said miniscus advances toward said top of said collection chamber, from a configuration, caused by the presence of said elongate object, wherein the opposing sides of the meniscus are in a plane other than horizontal to a configuration wherein the opposing sides of said meniscus are in a substantially horizontal plane.

5. The device of claim 4 wherein said membrane is shaped as an elongate walled enclosure and said elongate object comprises a rod located within the walls of said enclosure spaced apart therefrom and extending along the length thereof.

6. The device of claim 4 including an object within said container means disposed in spaced-apart juxtaposed relationship with the top of said collection chamber for displacing a portion of said sample in a plane coincident with the top of said collection chamber.

7. The device of claim 4 wherein said meniscus reorientation means comprises surface means formed on said elongate object for providing said elongate object with an irregular cross-section along its length thereby varying the space between said elongate object and said membrane at predetermined locations along the length of said elongate object.

8. The device of claim 4 including horizontally adjustable positioning means for movably mounting said elongate object in any of a plurality of substantially vertical positions within said container means.

* * * * *